United States Patent [19]

Köpf

[11] 4,300,407
[45] Nov. 17, 1981

[54] MOUNTING FOR AN ADJUSTABLE STEERING HAND WHEEL FOR MOTOR VEHICLES

[75] Inventor: Wolfgang Köpf, Stuttgart, Fed. Rep. of Germany

[73] Assignee: Daimler-Benz Aktiengesellschaft, Stuttgart, Fed. Rep. of Germany

[21] Appl. No.: 110,700

[22] Filed: Jan. 9, 1980

[30] Foreign Application Priority Data

Jan. 13, 1979 [DE] Fed. Rep. of Germany ....... 2901192

[51] Int. Cl.$^3$ .......................... B62D 1/18; G05G 5/18; G05G 5/22
[52] U.S. Cl. ....................................... 74/493; 74/531; 74/534; 74/535
[58] Field of Search ................. 74/493, 531, 534, 535, 74/536

[56] References Cited

U.S. PATENT DOCUMENTS

| | | | |
|---|---|---|---|
| 3,962,931 | 6/1976 | Moneta | 74/531 |
| 4,078,448 | 3/1978 | Naka | 74/493 |
| 4,102,218 | 7/1978 | Naka et al. | 74/493 |

*Primary Examiner*—Allan D. Herrmann

*Attorney, Agent, or Firm*—Craig and Antonelli

[57] ABSTRACT

A mounting for an adjustable steering hand wheel for motor vehicles with an outer column immovably secured at the vehicle body and with a bearing housing pivotally secured at the upper end of the outer column by way of a pivot joint; a steering shaft extends through the outer column which is connected with a steering shaft section non-rotatably connected with the steering hand wheel and rotatably supported in the bearing housing by way of a shaft joint, whereby the bearing housing is provided with an arm extending along the outer column; an adjustable form-locking detent means pairing is arranged between the end of the arm and the outer column whose one part consists of a detent row and whose other part consists of a locking member cooperating with the detent row and adapted to be lifted radially out of the detent row, whereby one of the two parts of the detent means pairing is arranged at the end of the arm and the other part at a corresponding place at the outer column corresponding to the end area of the arm; the detent means pairing itself is provided on a separate part which is movable to its associated structural part and is adapted to be locked in a position relative to the structural part.

47 Claims, 10 Drawing Figures

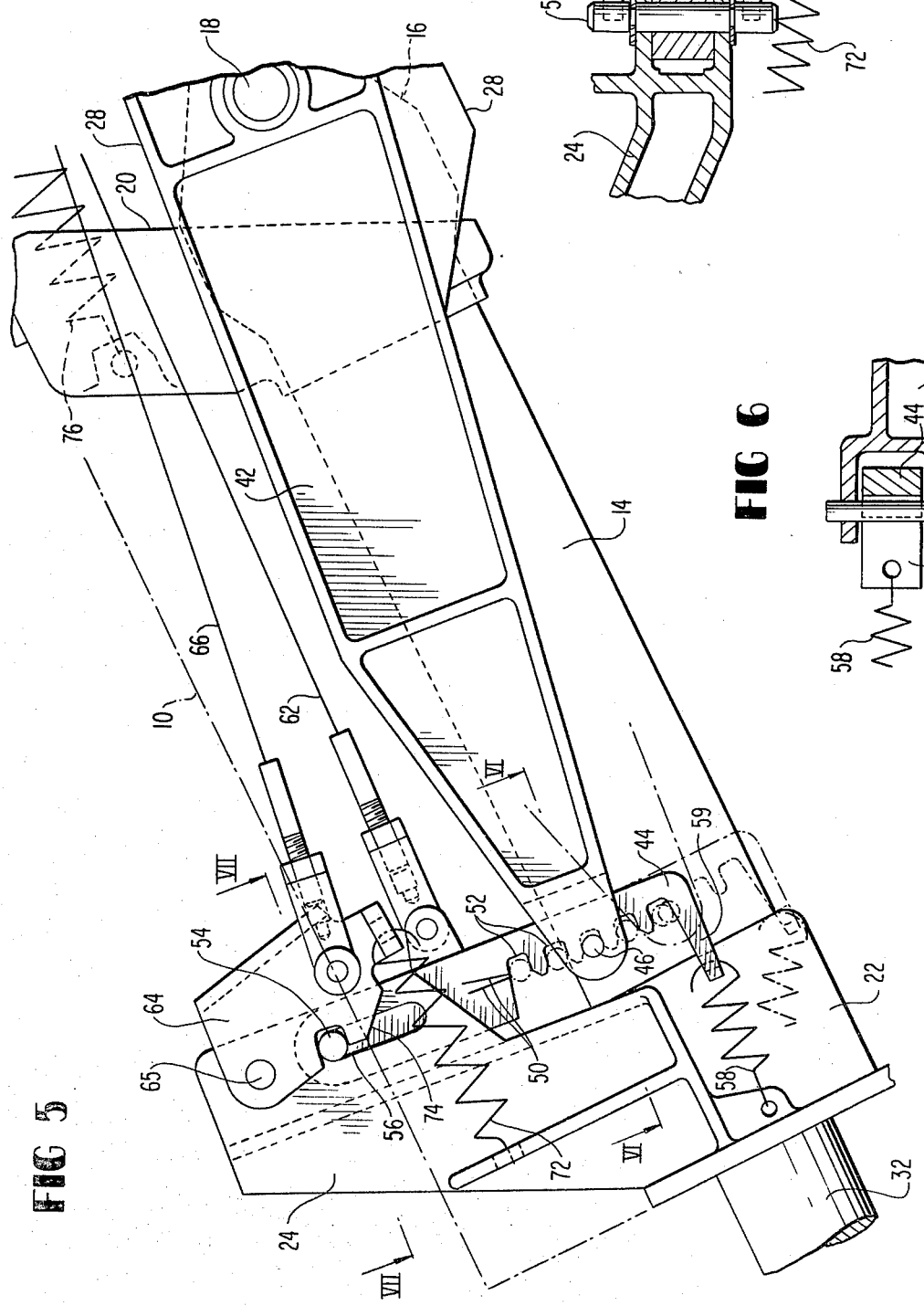

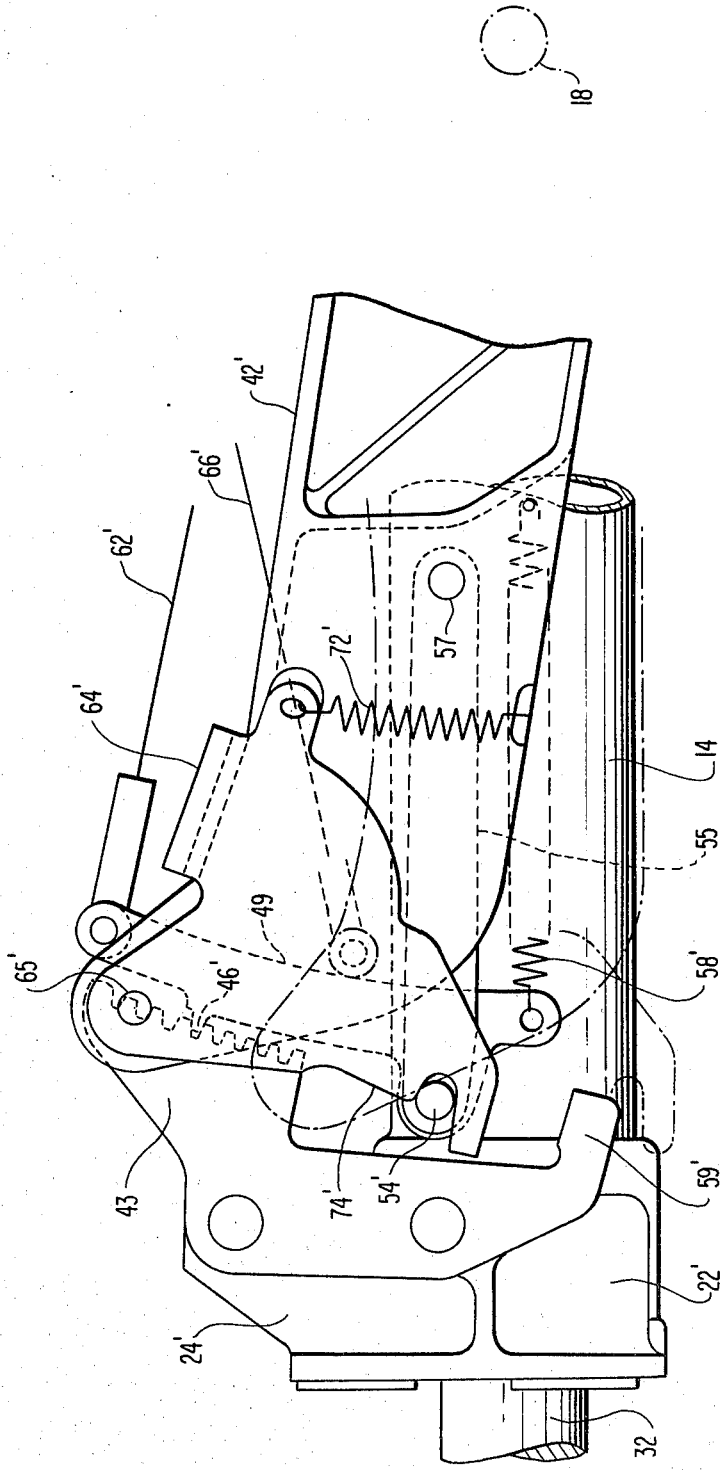

MOUNTING FOR AN ADJUSTABLE STEERING HAND WHEEL FOR MOTOR VEHICLES

The present invention relates to a mounting for an adjustable steering hand wheel for motor vehicles of the type disclosed in the German Auslegeschrift No. 26 30 370.

The adjustability of the steering wheel serves for the purpose of a convenient and fatigue-free seating at the steering hand wheel and thus indirectly also contributes to the traffic safety. Each driver should have the possibility to adjust optimally the steering hand wheel corresponding to his or her body dimensions. As such, an arrangement of the steering hand wheel which is relatively low is favorable in numerous cases. With known adjustable mounting supports of the steering wheel, such a low adjustment of the steering wheel is nonetheless not chosen because it impairs the ingress into and egress from the vehicle and would make necessary an adjustment of the steering hand wheel during each boarding and leaving of the vehicle. Consequently, a compromise is sought for practical reasons in connection with the adjustment of the steering hand wheel by the individual driver which, on the one hand, enables an unimpaired boarding and leaving and, on the other hand, enables a relatively comfortable and convenient handling during the vehicle steering.

It is the aim of the present invention to provide a mounting support for an adjustable steering hand wheel which enables both an optimum adjustment of the steering hand wheel during the driving as also a trouble-free ingress and egress.

The underlying problems are solved according to the present invention in that a portion of the detent means pairing provided for locking the steering hand wheel in a given position are provided on a part, separate with respect to the associated structural part, such as the steering column or arm, which part is movable in the direction of the detent row and is lockable in a single position relative to the structural part. Owing to the movability of one of the two parts of the detent means pairing, the steering hand wheel can be tilted out of the operating position into a pivoted-up position, in which one is able to board or leave the vehicle without any difficulty. This boarding-assist position of the steering hand wheel can be brought about without having to adjust the operating position. When pivoting down the steering hand wheel, the latter automatically re-engages in the previously adjusted position.

Accordingly, it is an object of the present invention to provide a mounting for an adjustable steering hand wheel for motor vehicles, which avoids by simple means the aforementioned shortcomings and drawbacks encountered in the prior art.

Another object of the present invention resides in a mounting support for an adjustable steering hand wheel for motor vehicles which permits both an optimum positioning of the steering hand wheel for driving convenience, as well as ease of ingress and egress into and out of the vehicle.

A further object of the present invention resides in a mounting for an adjustable steering hand wheel for motor vehicles which is simple in construction, yet permits maximum convenience to the driver both for driving purposes and boarding purposes.

Still a further object of the present invention resides in a mounting for an adjustable steering hand wheel in which a detent mechanism is provided that permits the steering hand wheel to be tilted up during boarding of the vehicle without affecting the basic adjustment of the steering hand wheel thereby assuring optimum convenience to the driver during the operation of the vehicle.

Still another object of the present invention resides in an adjustable steering hand wheel which is simple in construction, utilizes relatively few parts and assures completely satisfactory operation for its intended purposes.

These and other objects, features and advantages of the present invention will become more apparent from the following description when taken in connection with the accompanying drawing which shows, for purposes of illustration only, several embodiments in accordance with the present invention, and wherein:

FIG. 5 is a somewhat schematic side elevational view of the lower part of the mounting support of the steering hand wheel according to FIGS. 1 and 2, illustrating on an enlarged scale the details indicated by the dot and dash circle of FIG. 1 and designated therein by reference numeral 5;

FIG. 6 is a partial cross-sectional view taken along line VI—VI of FIG. 5 and illustrating certain details of the mounting support in accordance with the present invention;

FIG. 7 is a partial cross-sectional view, taken along line VII—VII of FIG. 5, and illustrating some details of the mounting support in accordance with the present invention;

Figure 9:
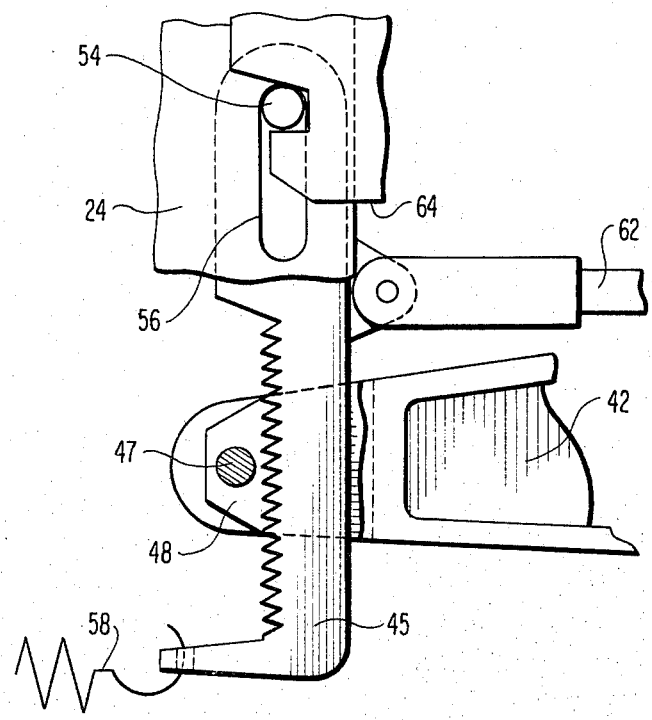

FIG. 9 is a somewhat schematic partial elevational view of a further modified embodiment of a detent means pairing between the arm and rack for a steering wheel mounting support in accordance with the present invention; and FIG. 10 is a somewhat schematic partial elevational view corresponding to FIG. 5 and illustrating a further embodiment of a mounting support in accordance with the present invention.

Figure 2:
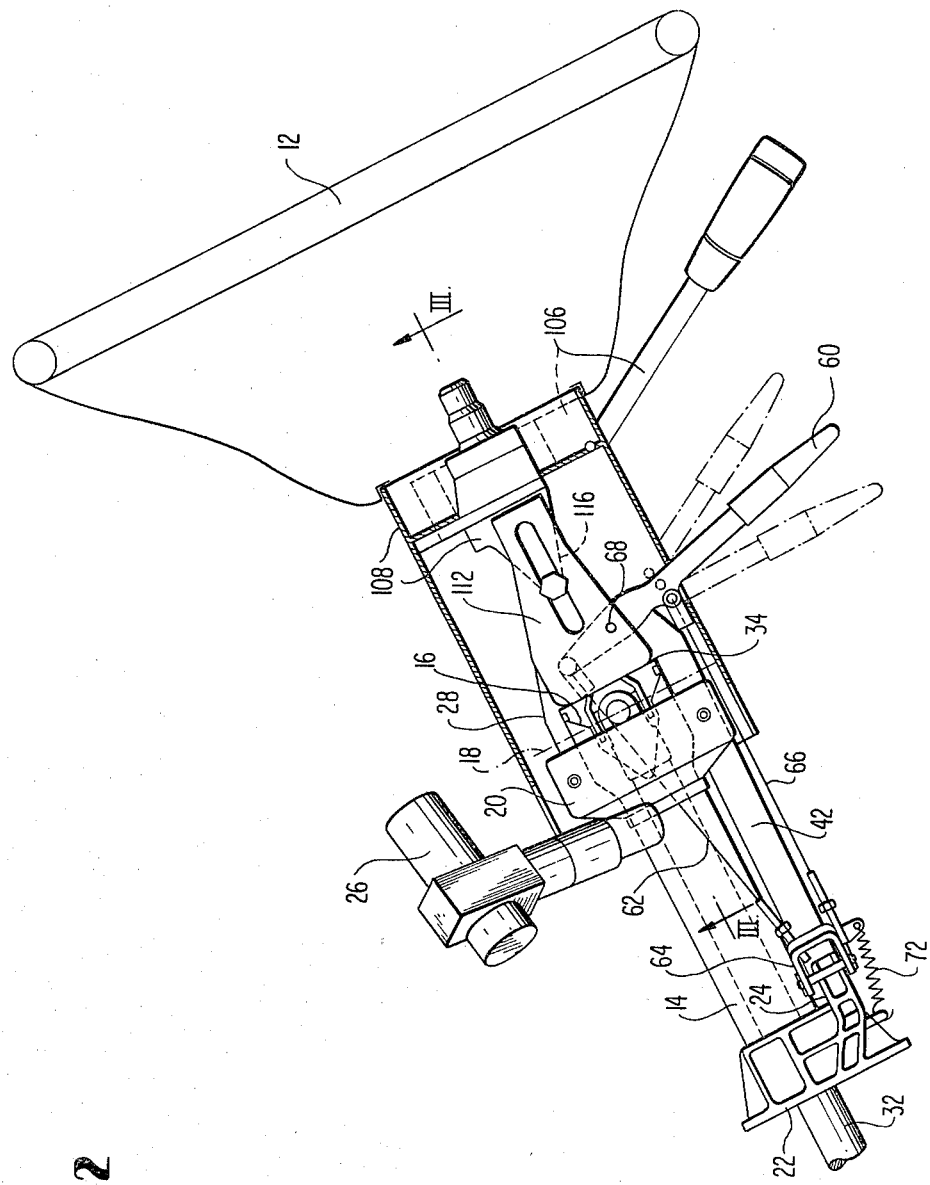
FIG. 2 is a top plan view on the steering wheel of FIG. 1, with some of the parts again shown in cross section.
Figure 4:
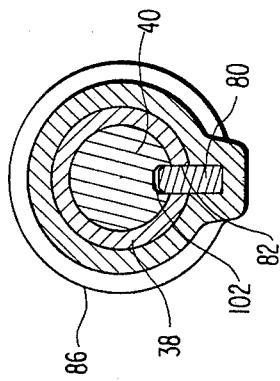
FIG. 4 is a transverse cross-sectional view through the pivotal part of the steering shaft taken along line IV—IV in FIG. 3.
Figure 3:
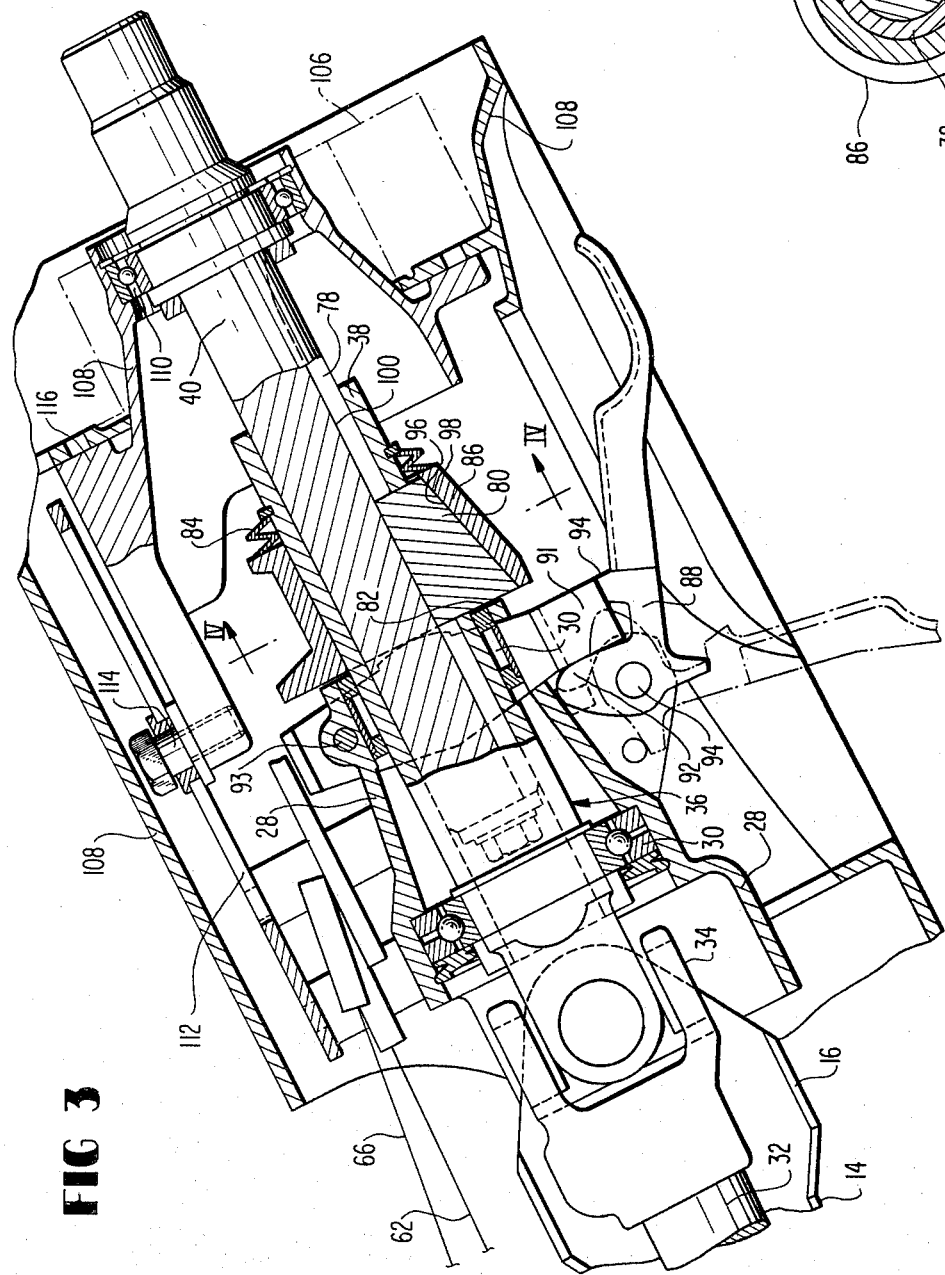
FIG. 3 is a longitudinal cross-sectional view through the pivotal part of the steering wheel mounting support of the present invention, taken along line III—III of FIG. 2.

Referring now to the drawing wherein like reference numerals are used throughout the various views to designate like parts, the adjustable mounting support for a steering hand wheel 12 illustrated in the various figures of the drawing is based on an outer column 14 which is immovably held at the vehicle body 10. The outer column 14 includes at its lower end a reinforcing and fastening ring 22 and at its upper end a mounting bracket 20; both the ring 22 and the bracket 20 are threadably connected with the vehicle body. The steering shaft 32, which is adapted to be driven by the steering hand wheel 12, is immovably supported on the inside of the steering column 14; the steering shaft 32 leads at the lower end to the steering gear of the vehicle steering system. A forked joint 16 with a horizontally disposed pivot axis formed by the pivot shaft 18 is arranged at the upper end of the outer column 14. A bearing housing 28 is pivotally connected with the outer column 14 by way of this pivot shaft 18. A pivotal steering shaft section generally designated by reference numeral 36 (FIG. 3) is supported in the bearing housing 28 by means of bearings 30, which is non-rotatably but pivotally connected with the stationary steering shaft 32 by way of a shaft-joint or universal-joint 34. The pivot axis of this joint 34 coincides with the pivot axis of the pivot shaft 18 of the bearing housing 28, respectively, of the fork-joint 16. The pivotal shaft section 36 is constructed two-partite including a hollow shaft 38 (FIG. 3) and a shaft 40 axially movably guided therein in order to enable an additional axial adjustment of the steering hand wheel, as will be explained more fully hereinafter. The ignition lock 26 (FIGS. 1 and 2) is arranged at a suitable circumferential place of the outer column 14, which is coupled with a mechanical lock of the steering shaft relative to the outer column 14; since the details of the ignition lock 26 are known as such, they are not illustrated in detail herein. The bearing housing 28 is provided with an arm 42 (FIGS. 1, 2 and 5) which extends externally adjacent the outer column 14 approximately parallel thereto in the direction toward the reinforcing and fastening ring 22. A pivotal arm 24 is provided on the reinforcing ring 22. An adjustable form-locking detent means pairing for the adjustment of the pivot position of the bearing housing 28 and therewith for the height adjustment of the steering hand wheel 12 is provided between the pivot arm 24 and the arm 42 of the bearing housing. In the embodiment illustrated in FIGS. 1 to 7, the detent means pairing consists of a toothed rack 44 pivotally mounted on the pivotal arm 24 and of a locking bolt 46 fixedly arranged at the end of the arm 42 which engages into the tooth gaps 52 of the rack 44. The rack 44 is constructed in the shape of a circular arc with its center point disposed concentrically to the pivot center 18 of the bearing housing 28. The tooth flanks delimiting the tooth gaps 52 are slightly inclined to one another so that a play-free engagement of the toothed rack 44 is possible by way of the bolt 46. The pivot axis 54 (FIGS. 5 and 7) of the rack 44 is so arranged that it lies within the angular space subtended by the lines 50 normal to the tooth flanks. A movability transversely to the row of the tooth gaps results from the pivotal arrangement of the rack 44 so that a disengaging movement approximately radially with respect to the pivot axis of the pivot shaft 18 is made possible from the rack. An abutment tooth 59 is arranged at the lower end of the rack 44 which, on the one hand, prevents a disengagement of the bolt 46 out of the area of the rack 44 and which serves simultaneously for the suspension of the engaging spring 58 which establishes a play-free form-locking connection between bolt and tooth gap in the engaged condition. The spring 58 must be designed so strongly that with extreme radial loads of the steering hand wheel, a disengagement of the bolt out of a tooth gap is avoided with certainty. A particularly slight mutual flank inclination of the tooth gaps is appropriate therefor; however, a self-jamming must be avoided. The toothed rack 44 can be disengaged from the the bolt 46 against the force of the engaging spring 58 for adjustment purposes by way of a draw cable pivotally connected thereto and actuated by a manual lever. A template 56 which is disposed tangentially in relation to the pivot center 18 of the bearing housing 28, is mounted on the pivot arm 24 of the outer column 14, in which the pivot bolt 54 of the rack 44 is adapted to move up and down. The pivot bolt 54 can be form-lockingly latched in the upper end position of the template 56 by a locking catch 64 which is pivotal about the shaft 65 and extends hook-shaped over the ends of the bolt 54. The flanks of the hook opening are also slightly inclined to the pivot direction so that the bolt 54 can be retained without play in the end position of the template 56. The locking catch 64 is urged into the closed condition by the force of the return spring 72. On the other hand, the locking catch 64 can be released against the spring force by way of a draw cable 66 from a manual lever to be explained more fully hereinafter. An inclined deflection surface 74 is provided along the outside of the hook of the locking catch 64, which makes possible an automatic release of the locking catch during the engagement of the bolt 54 from below. By lifting the locking catch 64, the toothed rack 44 can be pivoted downwardly and thus the steering hand wheel 12 can be pivoted upwardly into the boarding-assist position—without having to disengage the detent means pairing 44, 46. The operating position can be brought about automatically by pulling down the steering hand wheel 12, whereby the pivot bolt 54 of the rack 44 engages automatically into the locking catch 64 by way of the inclined deflection surface 74. In order that the boarding-assist position of the steering hand wheel can remain preserved—without having to hold fast the steering hand wheel—, an erecting spring 76 is arranged between the mounting bracket 20 of the outer column 14, on the one hand, and the bearing housing 28, on the other, which is so strongly dimensioned that it can hold the weight of the steering hand wheel 12 and of the parts connected therewith, such as operating parts, housing parts, as well as the pivotal shaft section 36, without difficulties in the erected condition, i.e., in the contracted condition of the spring 76. The aforementioned manual lever 60 is pivotally connected at the bearing housing 28 on a pivot shaft 68 (FIG. 2); the draw cable 66 for the locking detent 64 is suspended at the manual lever 60 on the side facing the handle while the draw cable 62 for the rack 44 is suspended thereon on the opposite side relative to the pivot center 68. In the center position of the manual lever 60 illustrated in full lines in FIG. 2, both draw cables 62 and 66 are tensioned without, however, a loosening of the rack 44, respectively, of the locking catch 64 out of the engaging condition. By pressure on the manual lever 60 in the direction toward the forward dash-and-dotted position 60a, the rear draw cable 62 for the rack 44 which is disposed opposite the handle, is tensioned and thus the engaging condition of the detent means pairing 44, 46 is disengaged for purposes of the steering hand wheel adjustment. By a pull on the manual lever 60 in the direction toward the rear lever position 60b nearer the steering hand wheel also illustrated in dash-and-dotted lines, the forward draw cable 66 for the locking catch 64 which is disposed nearer the handle, is tensioned and the locking catch 64 is released. As a result thereof, the steering hand wheel 12 is automatically pivoted up into the boarding-assist position by the erecting spring 76. A convenient ingress and egress is now possible notwithstanding a relatively low operating position of the steering hand wheel. As long as the driver has left the vehicle, the steering hand wheel remains in the boarding-assist position. Only after the driver has again boarded the vehicle and sits behind the steering wheel, the operating position which had previously been adjusted can be brought about again merely by pulling down the steering hand wheel. The pivot bolt 54 of the rack 44 thereby automatically engages in the upper locked end position of the template 56 without a change in the meantime in the relative locking position between rack 44 and bolt 46. This movement possibility exists, on the one hand, because the rack 44 has two degrees of freedom of movement and because the detent means pairing between rack 44 and arm 42 permits easy pivot movements parallel to the shaft 18. The lowered condition of the rack 44 (boarding-assist position) is indicated in FIG. 5 in dash and dotted lines; the engaging spring 58 also partakes in this downward movement as pivot movement. The movability of the rack 44 along two degrees of freedom and the utilization of the hand lever 60 for two functions permits the particularly simple illustrated actuation of the steering wheel adjustment in the height direction by means of only a single lever.

In the modification of the detent means pairing illustrated in FIG. 9, a toothed rack segment 48 pivotal about a bolt 47 is provided at the end of the arm 42. The toothed rack 45 and the toothed rack segment 48 have a very fine tooth pitch, whence a height adjustment of the steering hand wheel in fine steps becomes possible. As to the rest, the embodiment according to FIG. 9 corresponds with the embodiment already described hereinabove. Also, in this embodiment, the toothed rack can be moved up and down—without having to disengage the detent condition of the detent means pairing—whereby easy pivot movements between rack 45 and arm 42 occur about the pivot bolt 47.

Figure 1:
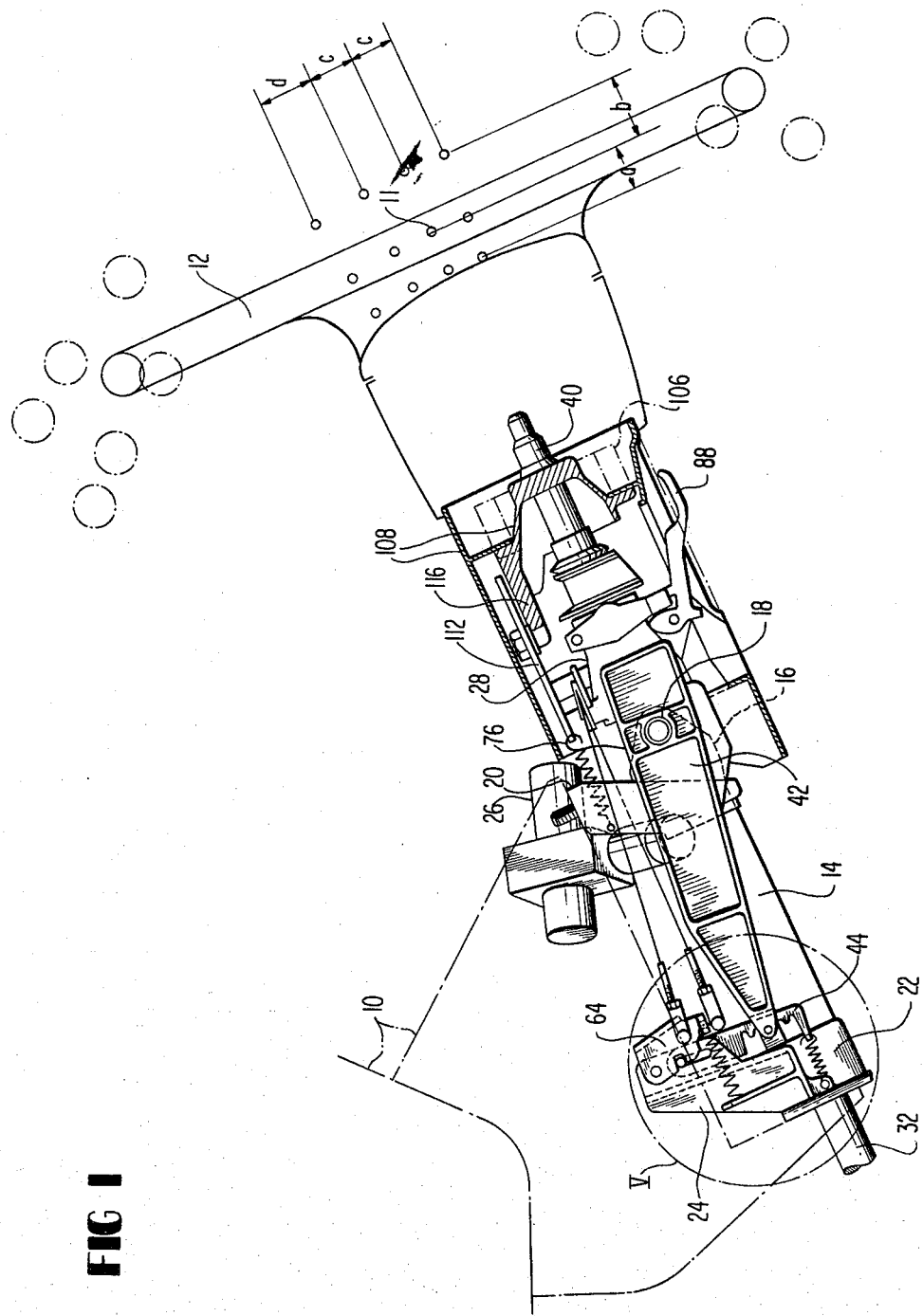
FIG. 1 is a somewhat schematic side elevational view, partly in cross section, of a first embodiment of an adjustable mounting support of a steering hand wheel according to the present invention.

The adjusting travels, respectively, possibilities of the steering hand wheel are indicated in FIG. 1. Starting from a neutral position of the steering hand wheel 12 illustrated in full lines—in this position the center point of the steering hand wheel is indicated by reference numeral 11—the locking bolt 46 at the end of the arm 42 is engaged in a middle tooth gap 52 of the rack 44. Depending on the length of the toothed distance on both sides of this middle engaging position, the steering hand wheel can be adjusted radially upwardly and downwardly by the distance c, whereby depending on tooth pitch, a certain number of intermediate steps is possible. Starting from each adjusted operating position, the steering hand wheel can additionally be pivoted up by the distance d upwardly into a boarding-assist position. This adjusting dimension is determined by the length of the template 56. It is indicated in FIG. 1 following the uppermost operating position; however, as already mentioned, it can adjoin upwardly from any desired intermediate position.

The further embodiment of a steering hand wheel mounting support illustrated partialy in cross section in FIG. 10—similar to FIG. 5—differs from the embodiment according to FIGS. 1 to 7, especially according to FIG. 5, respectively, from the embodiment according to FIG. 9, on the one hand, in that the movable part of the detent means pairing is arranged at the end of the arm 42' of the bearing housing (pivot shaft 18) and the immovable part is arranged at the outer collumn 14, respectively, at the reinforcing ring 22'. The advantage of the coordination of the movable part of the detent means pairing to the arm 42' resides in the fact that the adjustment of the tensioning cables for the actuation of this movable part and of the locking catch during the adjustment of the steering hand wheel remains always the same because the manual lever for the draw cables—which is to remain at a constant relative position to the steering hand wheel—is pivotally connected at the bearing housing which is pivoted along. As further differentiation, one should mention that the longitudinal guidance of the movable part of the detent means pairing in the direction of the detent row is effected by a rocking or pivot lever 55 directed radially onto the housing pivot axis 18. Corresponding to the embodiments described hereinabove, provision is also made in this embodiment that the toothed rack is coordinated to the outer column—even though immovably in this case—and the locking tooth which is movable in this case, is coordinated to the arm.

The reinforcing ring 22' provided at the lower end of the outer column 14 carries a fastening arm 24', at which a steel plate is threadably secured, into which a toothed rack 43 fixed relative to the outer column is machined in, whose teeth are arranged on a circular arc disposed concentrically to the pivot axis 18 and whose tooth surfaces are disposed parallel to this pivot axis. The steel plate additionally carries an abutment tooth 59' for the limitation of the pivot travel of the arm 42' in the downward direction.

The arm 42' which is U-shaped in cross section in the lower part thereof, is slightly cranked up at its outermost end with its two side walls and carries thereat a bearing eye for the pivot shaft 65' of the locking catch 64'. The essentially U-shaped locking catch 64' extends externally over the end of the arm 42'. The locking catch 64' is stressed by a return spring 72' in the clockwise direction to engage by means of a hook-shaped aperture over the pivot bolt 54' to be described more fully hereinafter; the locking catch 64' can be disengaged out of the locking condition against the force of the return spring 72' by way of a draw cable 66'. A double-armed or fork-shaped pivot lever 55 is arranged on the inside between the lateral legs of the arm 42', which is directed essentially radially onto the pivot axis 18. It is pivotally supported on the inside of the arm 42' on the pivot joint 57. At about the same radial distance which the pivot shaft 65' has from the pivot shaft 18, a pivot bolt 54' is arranged at the pivot lever 55, which extends parallel to the pivot shaft 18. A locking member 49 is pivotally supported thereon as the movable part of the detent means pairing. The locking member 49 carries a locking tooth 46' engaging into the tooth row. The pivot bolt 54' projects on both sides and engages into the hook-shaped aperture in the locking catch 64'. In the engaged condition of the locking catch 64', the pivot bolt 54' and together with the same the locking member 49 are locked against vertical movements in the direction of the tooth row. An engaging spring 58' constructed as drawspring which is disposed opposite the locking tooth 46' in relation to the pivot bolt 54', engages at the locking member 49; the engaging spring 58' is suspended with its other end at the arm 42' and urges the locking tooth 46' into a tooth gap of the toothed rack 43. For the adjustment of the steering hand wheel mounting support, the locking tooth 46' can be lifted out of the engaging or detent position against the force of the engaging spring 58' by way of a draw cable 62' engaging at the locking member 49 and can then be lowered again into another tooth gap. For purposes of leaving the vehicle, the latched condition of the locking catch 64' is released, whereby the arm 42' and the locking catch 64' can be lowered into the lower position indicated in dash-and-dotted lines and the steering hand wheel can be lifted into a corresponding raised position. The pivot bolt 54' thereby disengages in a relative upward direction out of the hook-shaped aperture of the locking catch 64'. In the lower extreme position indicated in dash-and-dotted lines, the pivot bolt 54' is disposed on the back of the locking catch 64' in a small recess, whereby it contributes in conjunction with the return springs 72' to hold fast this extreme position against the gravitational force of the steering wheel and of the parts connected thereto. This trough-shaped recess includes an inclined deflection surface 74' in the direction toward the hook-shaped or V-shaped recess which is effective in the normal locking condition of the locking catch; when pulling down the steering hand wheel after the boarding and after the lifting of the arm 42' into the position illustrated in full lines, the inclined deflection surface 74' automatically lifts the locking catch 64' against the force of the return spring automatically into a released position, from which it can engage into the locking or latching position.

In addition to a radial adjustment of the steering hand wheel in the height direction, also an adjustment in the axial direction is desirable. Starting from a neutral position illustrated in the various figures, also an axial displacement path a and b (FIG. 1) forwardly, respectively, rearwardly is to be made possible.

For an axial adjustment of the steering hand wheel, the pivotal steering shaft section 36 is constructed as hollow shaft 38 with a shaft 40 axially movably, but non-rotatably, guided therein. In the embodiment according to FIGS. 1 to 7, a longitudinal groove 78 of rectangular cross section is machined into the axially movable shaft 40. The flat groove bottom 100 (FIG. 3) is provided with splined teeth 102 (FIG. 4) extending transversely to the longitudinal groove 78. A predetermined machined-in opening 82 for the radial passage of an entrainment member 80 engaging into the groove 78 is provided in the hollow shaft 38. The entrainment member 80 is guided therein radially movably, but far-reachingly without play. A sliding sleeve 86 is arranged about the hollow shaft 38 which also surrounds the entrainment member 80 on the backside 98 thereof. The sliding sleeve 86 is axially under the prestress of a package of cup springs 84. The prestress springs 84 are supported, on the one hand, at an inset collar of the hollow shaft 38 and press the sliding sleeve 86 in the direction toward the bearing housing 28. The sliding sleeve 86 also includes a longitudinal groove having the width of the entrainment member 80, which however has a different radial depth so that a wedging surface 96 inclined to the axial direction will result. This wedging surface 96 cooperates with the also wedge-shaped inclined backside 98 of the entrainment member 80. As a result of the prestress of the sliding sleeve 86 and as a result of this wedging surface pairing, the entrainment member 80 is also pressed radially into the longitudinal groove 78. The entrainment member 80 also possesses spline teeth on its end face engaging into the groove bottom 100, which together with the spline teeth of the groove bottom forms a form-locking detent means between entrainment member 80 and axially movable shaft 40. As a result thereof, in the illustrated engaged condition, not only a circumferential but also an axial relative fixing between the hollow shaft 38 and the axially movable shaft 40 is produced. The axial fixing can be released by pushing back the sliding sleeve 86 and by disengagement of the entrainment member 80 out of the spline tooth arrangement. For that purpose, a manual lever 88 is pivotally supported about a pivot shaft 92 on the bottom side of the bearing housing 28. The manual lever 88 includes a push-off cam 90 as well as abutments 94 which abutments are effective in the two end positions of the manual lever 88. By reason of the eccentric arrangement of the manual lever 88, the push-off cam 90 cannot act immediately on the sliding sleeve 86. Instead, a pressure member 91 is provided which is pivotal about the shaft 93 disposed opposite the pivot shaft 92, which surrounds the bearing housing 28 and which acts on two diametrally opposite circumferential points of the end face of the sliding sleeve. The pressure member 91 transmits the eccentrically engaging cam stroke concentrically and symmetrically onto the sliding sleeve 86. By pivoting the manual lever 88 in the direction of the arrow, the sliding sleeve 86 can be pressed toward the right against the force of the prestress springs 84, whereby the wedging surface 96 release the entrainment member 80 in the radial direction so that the spline-tooth connection 102 is disengaged. The push-off cam 90 in cooperation with the cam counter surface of the pressure member 91 and in cooperation with the end abutment 94 is so constructed that the lever 88 in the pivoted-out end position, illustrated in dash and dotted lines, automatically remains stationary or fixed with certainty. The manual lever 88 can be left onto itself for a certain length of time in this disengaged position without difficulty. The driver now has both hands free for the axial adjustment of the steering hand wheel into an axial position convenient to the driver. For limiting the axial displacement path in the upward direction, the longitudinal groove 78 is closed off at its lower end by a screwed-on disk which together with the end face of the entrainment member 80 acts as abutment. After the axial insertion of the steering hand wheel into the new intended position, the manual lever 88 is pivoted back into the recessed position, illustrated in full lines, whereby the prestress spring 84 presses the entrainment member 80 radially into the spline-tooth arrangement 102 by way of the wedging surface 96 and brings about an axial form-locking connection between the hollow shaft and the axially movable shaft.

Figure 8:
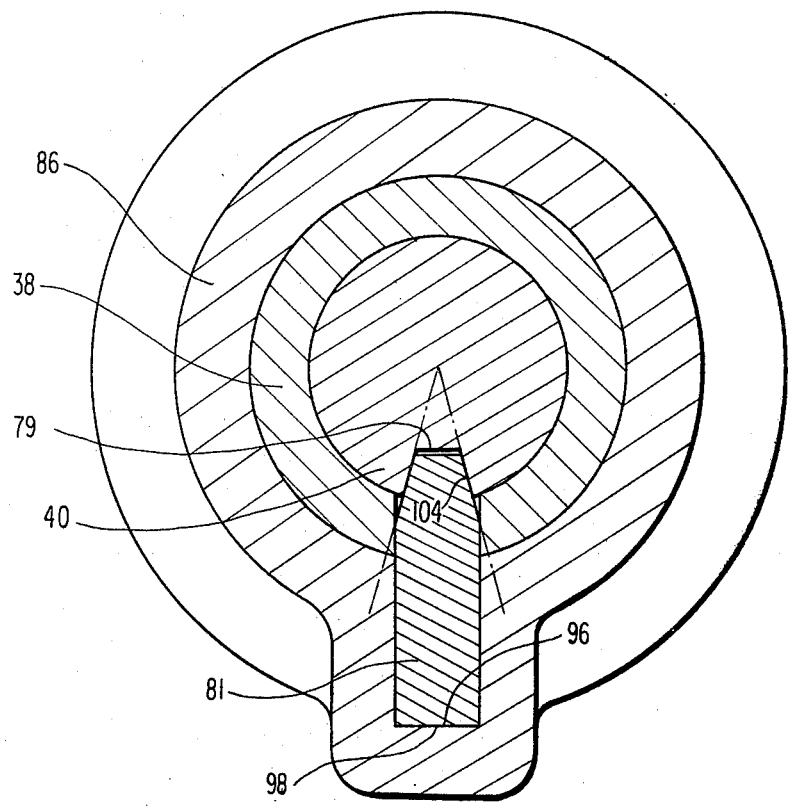
FIG. 8 is a transverse cross-sectional view, similar to FIG. 4, illustrating a modified embodiment of a steering hand wheel mounting support in accordance with the present invention.

The advantage of the form-locking axial connection between hollow shaft and axially movable shaft resides in the fact that very high axial forces can be withstood without difficulty by the steering hand wheel, without any axial adjustment on the part of the steering hand wheel. The prestress spring 84 can be constructed thereby moderately stiff. Disadvantageous in a form-locking connection is the fact that the entrainment member does not operationally reliably disengage in every case out of the form-locking connection, especially not when the steering hand wheel is in such a circumferential position, in which the longitudinal groove and the entrainment member are disposed on the top side of the axially movable shaft. Another embodiment of the axial locking of these two shaft parts which is illustrated in FIG. 8, provides for that reason a force-locking engagement. The longitudinal groove 79 of this embodiment includes V-shaped side flanks 104 which are mutually inclined. The side surfaces of the entrainment member 81 of this embodiment are also inclined V-shaped to one another in the part engaging in the longitudinal groove 79. As a result of a radial pressure on the entrainment member 81 by way of a very stiff prestress spring 84 and the wedging surface pairing 96, 98, the entrainment member 81 will wedge itself between the V-shaped inclined side flanks of the longitudinal groove 79 so that it is form-lockingly retained therein in the axial direction. With a suitable dimensioning of the mutual angle of inclination of the V-shaped side flanks, a sufficiently strong holding between hollow shaft and axially movable shaft can be assured also with such a form-locking connection.

Operating parts 106 (FIG. 2) such as, for example, turn-indicator, light signal, windshield wiper switch and the like are arranged in close proximity to the steering hand wheel. These operating parts should not lose their position relative to the steering hand wheel by an adjustment of the steering hand wheel. For this reason, a mounting housing 108 is rotatably supported on the axially movable shaft 40 by way of a rotary bearing 110 in fixed axial position relative to the steering hand wheel. The mounting housing 108 includes also the covering for the entire adjusting arrangement. For purposes of maintaining a constant circumferential position of the mounting housing 108, a longitudinal guidance 112 is arranged at the bearing housing 28, into which engages a guide arm 116 of the mounting housing by way of a guide bolt 114. During an axial adjustment of the steering hand wheel, the mounting housing 108 partakes in this adjustment movement so that the relative position of the operating parts with respect to the steering hand wheel remains preserved. Of course, the operating parts also partake in the adjusting movement during a radial adjustment of the steering hand wheel.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A mounting for an adjustable steering hand wheel for motor vehicles, comprising outer column means essentially immovably secured at a fixed vehicle part, bearing housing means pivotally secured at the upper end of the outer column means by way of a pivot joint means defining a pivot axis, a steering shaft means extending through the outer column means which is operatively connected by way of a shaft joint means with a steering shaft section non-rotatably connected with the steering hand wheel and supported in the bearing housing means, said bearing housing means being provided with an arm means extending adjacent the outer column means, and adjustable form-locking detent means between the arm means and the outer column means and having two cooperating detent parts, a first of said detent parts including detent row means and the second part including a locking means cooperating with the detent row means, one of the detent parts being operable to be moved at least approximately radially with respect to said pivot axis to effect engagement and disengagement between the two detent parts, one of the two parts of the detent means being operatively associated with the end area of the arm means and the other part being operatively associated with the outer column means at a place thereof corresponding to the end area of the arm means, and wherein one part of the detent means is provided on a separate member movable in the direction of the detent row means relative to its associated structural part consisting of outer column means or arm means and is lockable in a position relative to said structural part.

2. A mounting according to claim 1, characterized in that said pivot joint means is fork-shaped and has an essentially horizontal pivot axis.

3. A mounting according to claim 1 or 2, characterized in that the shaft joint means is disposed within the area of the pivot axis of said pivot joint means.

4. A mounting according to claim 3, characterized in that said detent row means is disposed tangentially or arcuately shaped in relation to the pivot axis of the bearing housing means.

5. A mounting according to claim 1, characterized in that the structural part carrying said one detent part has two degrees of freedom of movement including radial movability for the engagement and disengagement movement between the two parts of the detent means as also movability in the direction of the detent row means, and in that the other part of the detent means is immovably arranged relative to its associated structural part.

6. A mounting according to claim 5, characterized in that the structural part carrying the detent row means is provided at the outer column means and in that the locking means is provided near the end of the arm means.

7. A mounting according to claim 6, characterized in that the structural part carrying the detent row means is constructed as a toothed rack pivotally supported about a pivot shaft, whose pivot axis and whose teeth extend at least approximately parallel to the housing pivot axis and which is longitudinally movably supported at the outer column means substantially parallel to the tooth row and is latchable in an end position.

8. A mounting according to claim 7, characterized in that the locking means is constructed as a locking bolt extending at least approximately parallelly to the housing pivot axis.

9. A mounting according to claim 7, characterized in that the locking means is constructed as a toothed rack segment limitedly pivotal about a locking bolt extending at least approximately parallel to the housing pivot axis.

10. A mounting according to claim 6, characterized in that the structural part carrying the detent row means is constructed as a toothed rack means with the tooth surfaces thereof extending at least approximately parallel to the housing pivot axis, said toothed rack means being immovably secured at the outer column means and extending arcuately shaped substantially concentrically to the housing pivot axis, and in that the locking means includes a latchable lever having a locking member operable to engage into the toothed rack means, said lever being pivotally supported with two degrees of freedom in the end area of the arm means substantially parallelly to the housing pivot axis.

11. A mounting according to claim 7 or 10, characterized in that the tooth flanks of the tooth gaps of the toothed rack means are inclined slightly to one another to avoid self-jamming of the locking member engaging therebetween.

12. A mounting according to claim 11, characterized in that the pivot axis of the movable part of the detent means is arranged inside of the angular space subtended by tooth flank normals of the toothed rack means.

13. A mounting according to claim 12, characterized in that the movable part of the detent means is stressed by the force of a spring in the engaging direction toward the immovable part of the detent means and is operable to be disengaged by a manual lever against the spring force.

14. A mounting according to claim 13, characterized in that the pivot shaft of the movable part of the detent means is limitedly movably guided and is operable to be latched at the one end of the movement space corresponding to the normal position of the movable part of the detent means.

15. A mounting according to claim 14, characterized in that the pivot shaft of the movable part of the detent means is limitedly guided in a template arranged substantially tangentially in relation to the housing pivot axis.

16. A mounting according to claim 14, characterized in that the pivot shaft of the movable part of the detent means is limitedly movably guided near the end of a pivotally supported pivot lever directed approximately radially to the housing pivot axis.

17. A mounting according to claim 14, characterized in that a hook-like locking catch means is arranged within the end area of the movement space, which is pivotal substantially parallelly to the housing pivot axis, extends over the projecting ends of the pivot shaft of the structural part carrying the detent row means and is stressed by spring force in the direction toward said pivot shaft, and in that said locking catch means is operable to be released by a manual lever against the spring force.

18. A mounting according to claim 17, characterized in that the manual lever for the disengagement of the movable part of the detent means is identical with the lever for the release of the locking catch means, said movable part and said locking catch means being operatively connected with the pivotal manual lever by way of one draw cable each, the two draw cables being secured at the manual lever on opposite sides in relation to the pivot axis thereof in such a manner that by pivoting the manual lever in one direction, the movable part of the detent means is disengaged and by pivoting the manual lever in the other direction, the locking catch means is released.

19. A mounting according to claim 18, characterized in that the locking catch means is provided with an inclined deflection surface means at a place disposed in the displacement path of the pivot shaft of the movable part of the detent means for the automatic release of the locking catch means by a pivot bolt engaging the normal position.

20. A mounting according to claim 19, characterized in that a spring means is provided between the outer column means and the bearing housing means, which seeks to pivot the bearing housing means in the upward direction and which overcomes the weight of the steering hand wheel including all operating parts and covering parts movable in unison therewith.

21. A mounting according to claim 20, characterized in that the pivotal steering shaft section disposed above the shaft joint means is subdivided into two parts coaxially displaceable to one another, whose one shaft part includes an axially fixed hollow shaft supported in the bearing housing means, into which the other shaft part axially movable to said hollow shaft is fitted and form-lockingly non-rotatably guided therein, said two shaft parts being operable to be fixed relative to one another in any desired axial relative position.

22. A mounting according to claim 21, characterized in that a longitudinal groove is provided in the axially movable shaft, in that an opening extending in predetermined axial and circumferential direction is provided in the hollow shaft for the movable radial passage with small tolerance of an entrainment means effecting the non-rotatable form-locking connection between the hollow shaft and the axially movable shaft, a sliding sleeve means being disposed about the hollow shaft which is under axial prestress and surrounds the entrainment means on its outside, and in that a manual lever means is provided at one of the two parts consisting of bearing housing means and hollow shaft for the axial displacement of the sliding sleeve means against the spring force of the axial prestress, the sliding sleeve means being provided at least within the area including the entrainment means with a wedging surface extending inclined relative to the axial direction, cooperating with the back side of the entrainment means and radially pressing the same into the longitudinal groove, the axial prestress of the sliding sleeve means and the radial pressing of the entrainment means into the longitudinal groove effecting an axial fixing of the hollow shaft relative to the axially movable shaft.

23. A mounting according to claim 22, characterized in that said opening and said entrainment means are constructed at least approximately rectangularly in a cross section placed tangentially to the hollow shaft.

24. A mounting according to claim 22, characterized in that said opening and said entrainment means are constructed oval in the manner of a fitting spring—as viewed in a cross section placed tangentially to the hollow shaft.

25. A mounting according to claim 22, characterized in that the back side of the entrainment means has the same inclination as the wedging surface of the sliding sleeve means.

26. A mounting according to claim 25, characterized in that the longitudinal groove at the flat groove bottom and the entrainment means at its end face engaging into the longitudinal groove are provided with splined teeth transversely to the longitudinal groove which together effect a form-locking axial fixing between said hollow shaft and said axially movable shaft.

27. A mounting according to claim 25, characterized in that the flanks of the longitudinal groove and the side surfaces of the entrainment means are inclined to one another V-shaped within the area engaging into the longitudinal groove and together effect a form-locking fixing between said hollow shaft and said axially movable shaft.

28. A mounting according to claim 25, characterized in that a mounting housing means which receives operating parts disposed in proximity of the steering wheel, is supported on the axially movable shaft in fixed axial relative position to the steering hand wheel by way of bearing means, and in that a longitudinal guidance means maintaining the circumferential position of the mounting housing means and a guide arm with an engaging member engaging in the longitudinal guidance means are provided between the mounting housing means and the bearing housing means.

29. A mounting according to claim 1, characterized in that the structural part carrying the detent row means is provided at the outer column means and in that the locking means is provided near the end of the arm means.

30. A mounting according to claim 1 or 29, characterized in that the structural part carrying the detent row means is constructed as a toothed rack pivotally supported about a pivot shaft, whose pivot axis and whose teeth extend at least approximately parallel to the housing pivot axis and which is longitudinally movably supported at the outer column means substantially parallel to the tooth row and is latchable in an end position.

31. A mounting according to claim 30, characterized in that the locking means is constructed as a locking bolt extending at least approximately parallelly to the housing pivot axis.

32. A mounting according to claim 30, characterized in that the locking means is constructed as a toothed rack segment limitedly pivotal about a locking bolt extending at least approximately parallel to the housing pivot axis.

33. A mounting according to claim 29, characterized in that the structural part carrying the detent row means is constructed as a toothed rack means with the tooth surfaces thereof extending at least approximately parallel to the housing pivot axis, said toothed rack means being immovably secured at the outer columm means and extending arcuately shaped substantially concentrically to the housing pivot axis, and in that the locking means includes a latchable lever having a locking member operable to engage into the toothed rack means, said lever being pivotally supported with two degrees of freedom in the end area of the arm means substantially parallelly to the housing pivot axis.

34. A mounting according to claim 30, characterized in that the tooth flanks of the tooth gaps of the toothed rack means are inclined slightly to one another to avoid self-jamming of the locking member engaging therebetween.

35. A mounting according to claim 29, characterized in that the pivot axis of the movable part of the detent means is arranged inside of the angular space subtended by tooth flank normals of the toothed rack means.

36. A mounting according to claim 29, characterized in that the movable part of the detent means is stressed by the force of a spring in the engaging direction toward the immovable part of the detent means and is operable to be disengaged by a manual lever against the spring force.

37. A mounting according to claim 29, characterized in that the pivot shaft of the movable part of the detent means is limitedly movably guided and is operable to be latched at the one end of the movement space corresponding to the normal position of the movable part of the detent means.

38. A mounting according to claim 37, characterized in that a locking catch means is arranged within the end area of the movement space, which is pivotal substantially parallelly to the housing pivot axis, extends over the projecting ends of the pivot shaft of the structural part carrying the detent row means and is stressed by spring force in the direction toward said pivot shaft, and in that said locking catch means is operable to be released by a manual lever against the spring force.

39. A mounting according to claim 38, characterized in that the manual lever for the disengagement of the movable part of the detent means is identical with the lever for the release of the locking catch means, said movable part and said locking catch means being operatively connected with the pivotal manual lever by way of one draw cable each, the two draw cables being secured at the manual lever on opposite sides in relation to the pivot axis thereof in such a manner that by pivoting the manual lever in one direction, the movable part of the detent means is disengaged and by pivoting the manual lever in the other direction, the locking catch means is released.

40. A mounting according to claim 38, characterized in that the locking catch means is provided with an inclined deflection surface means at a place disposed in the displacement path of the pivot shaft of the movable part of the detent means for the automatic release of the locking catch means by a pivot bolt engaging the normal position.

41. A mounting according to claim 1 or 29, characterized in that a spring means is provided between the outer column means and the bearing housing means, which seeks to pivot the bearing housing means in the upward direction and which overcomes the weight of the steering hand wheel including all operating parts and covering parts movable in unison therewith.

42. A mounting according to claim 1 or 29, characterized in that the pivotal steering shaft section disposed above the shaft joint means is subdivided into two parts coaxially displaceable to one another, whose one shaft part includes an axially fixed hollow shaft supported in the bearing housing means, into which the other shaft part axially movable to said hollow shaft is fitted and form-lockingly non-rotatably guided therein, said two shaft parts being operable to be fixed relative to one another in any desired axial relative position.

43. A mounting according to claim 42, characterized in that a longitudinal groove is provided in the axially movable shaft, in that an opening extending in predetermined axial and circumferential direction is provided in the hollow shaft for the movable radial passage with small tolerance of an entrainment means effecting the non-rotatable form-locking connection between the hollow shaft and the axially movable shaft, a sliding sleeve means being disposed about the hollow shaft which is under axial prestress and surrounds the entrainment means on its outside, and in that a manual lever means is provided at one of the two parts consisting of bearing housing means and hollow shaft for the axial displacement of the sliding sleeve means against the spring force of the axial prestress, the sliding sleeve means being provided at least within the area including the entrainment means with a wedging surface extending inclined relative to the axial direction, cooperating with the back side of the entrainment means and radially pressing the same into the longitudinal groove, the axial prestress of the sliding sleeve means and the radial pressing of the entrainment means into the longitudinal groove effecting an axial fixing of the hollow shaft relative to the axially movable shaft.

44. A mounting according to claim 43, characterized in that the back side of the entrainment means has the same inclination as the wedging surface of the sliding sleeve means.

45. A mounting according to claim 43, characterized in that the longitudinal groove at the flat groove bottom and the entrainment means at its end face engaging into the longitudinal groove are provided with splined teeth transversely to the longitudinal groove which together effect a form-locking axial fixing between said hollow shaft and said axially movable shaft.

46. A mounting according to claim 43, characterized in that the flanks of the longitudinal groove and the side surfaces of the entrainment means are inclined to one another V-shaped within the area engaging into the longitudinal groove and together effect a form-locking fixing between said hollow shaft and said axially movable shaft.

47. A mounting according to claim 42, characterized in that a mounting housing means which receives operating parts disposed in proximity of the steering wheel, is supported on the axially movable shaft in fixed axial relative position to the steering hand wheel by way of bearing means, and in that a longitudinal guidance means maintaining the circumferential position of the mounting housing means and a guide arm with an engaging member engaging in the longitudinal guidance means are provided between the mounting housing means and the bearing housing means.

* * * * *